UNITED STATES PATENT OFFICE.

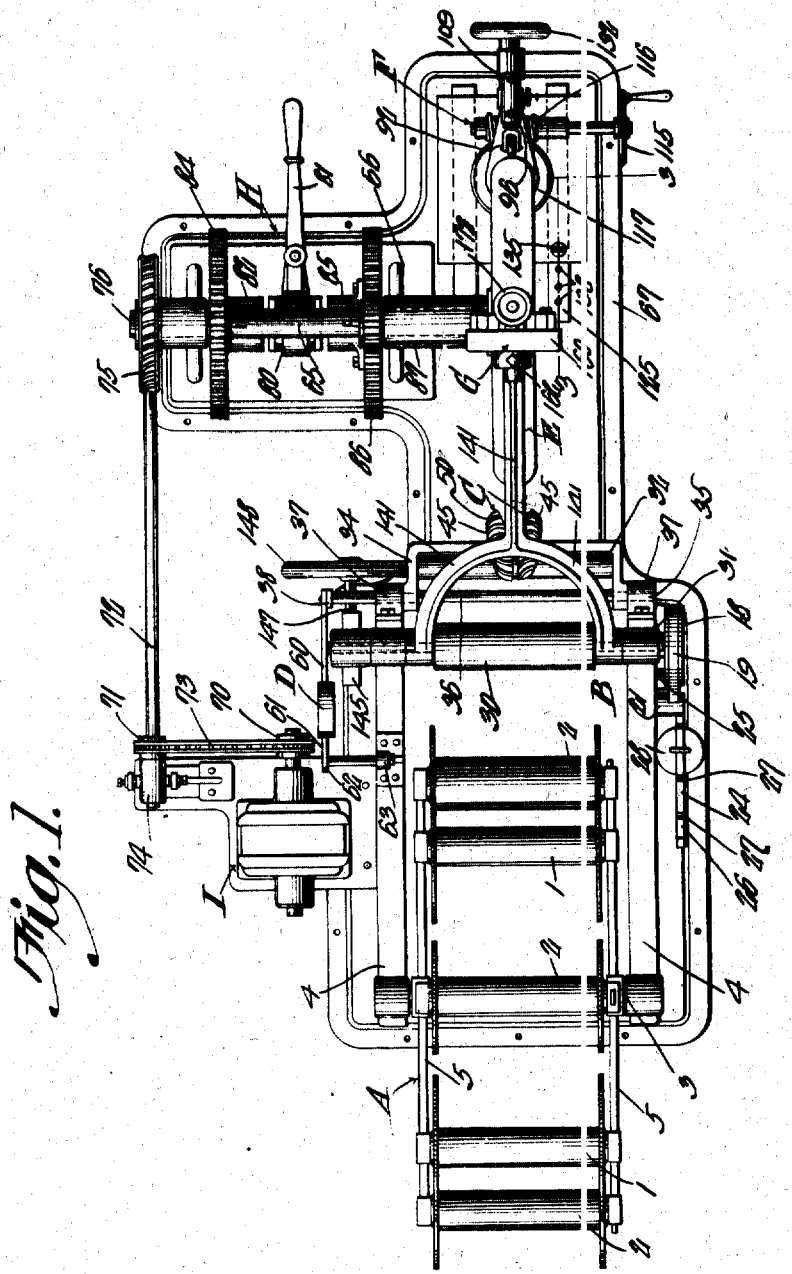

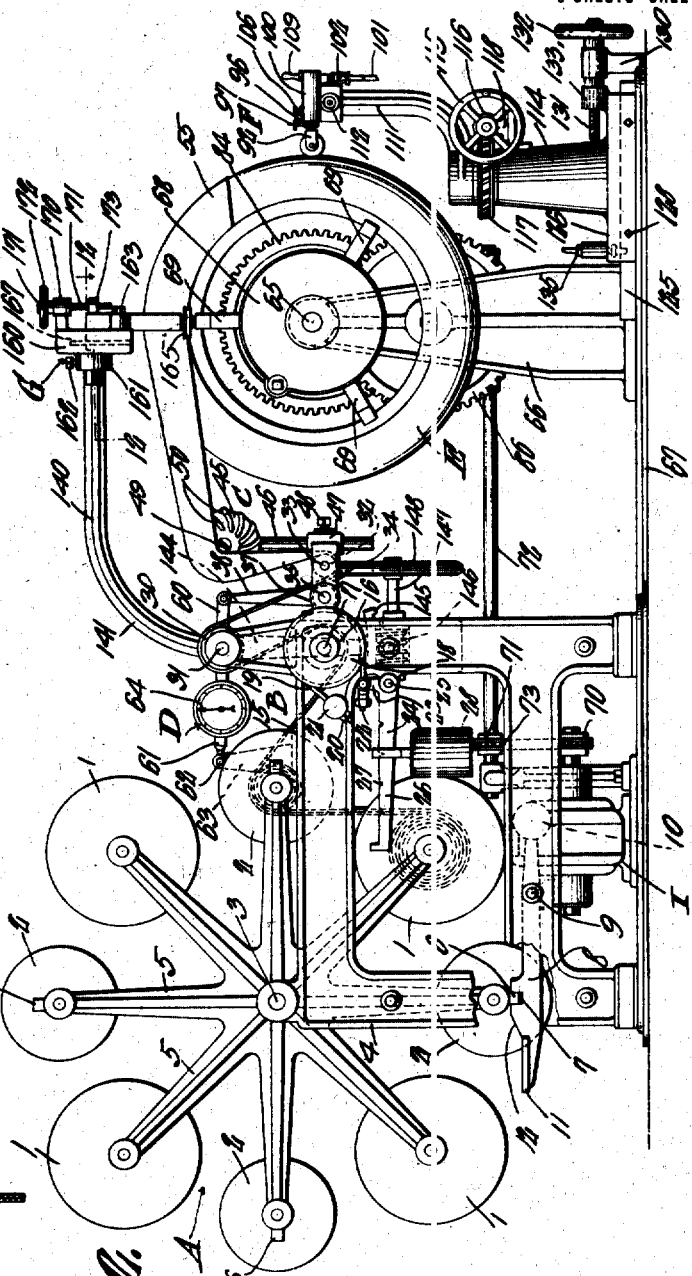

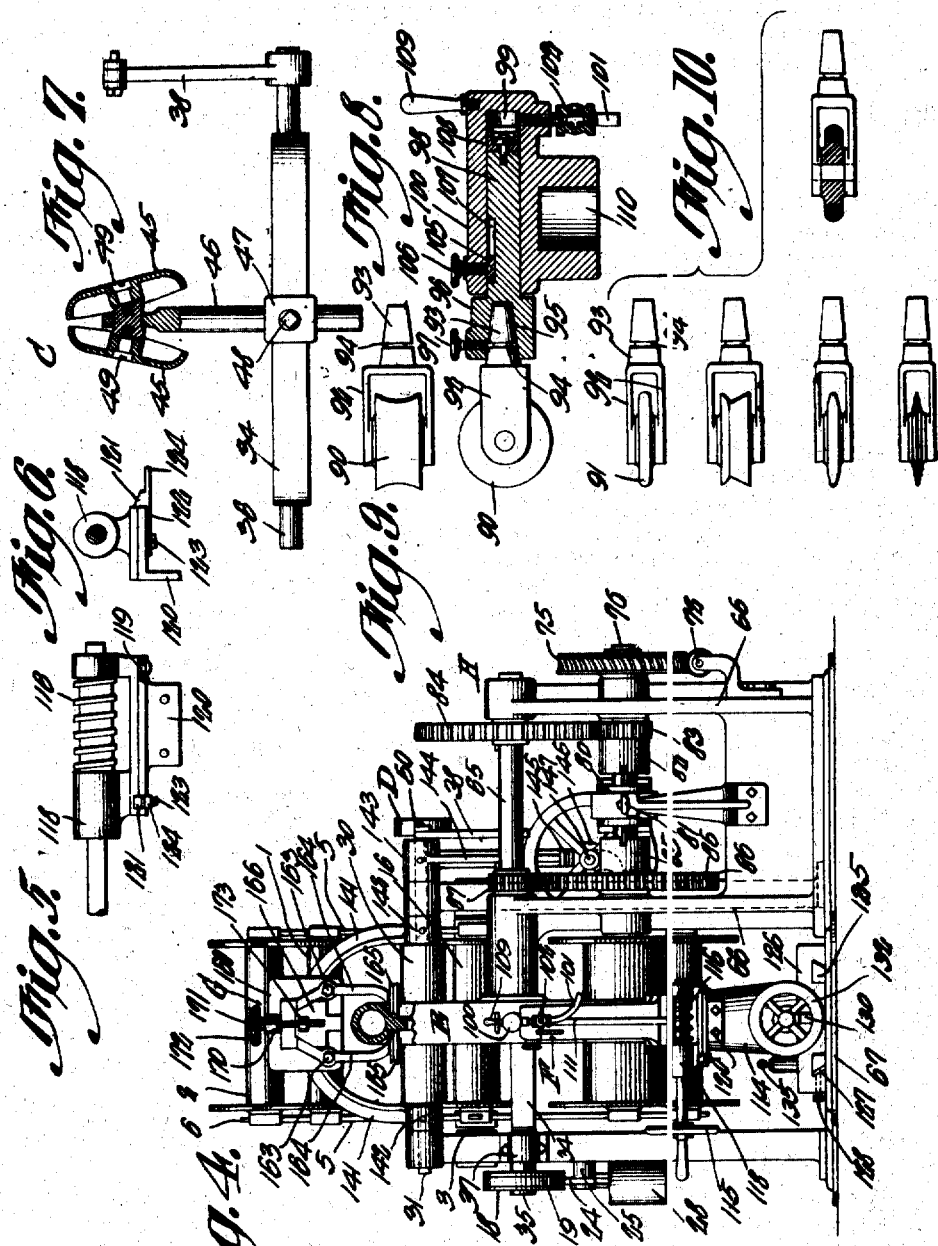

FRANKLIN W. KREMER, OF CARLSTADT, NEW JERSEY.

TIRE-SHOE-MAKING MACHINE.

1,216,329.  Specification of Letters Patent.  Patented Feb. 20, 1917.

Application filed August 9, 1912. Serial No. 714,289.

*To all whom it may concern:*

Be it known that I, FRANKLIN W. KREMER, a citizen of the United States, residing at Carlstadt, in the county of Bergen and State of New Jersey, have invented a new and useful Tire-Shoe-Making Machine, of which the following is a specification.

This invention relates to a tire making machine intended for the manufacture of laminated fabric casings or shoes for automobile tires and the like.

Laminated tire shoes are usually built on circular cores. In making the shoes, sheets of rubberized fabric, cut on the bias, and fed from suitable tables, reels, and other well-known fabric-holding devices, are superposed on each other on the circular core. The core may be rotated or spun at different speeds, either by hand or power, as desired, and suitable tread-forming, spinning, and other tools are pressed against the successive layers of the rubberized fabric, to work the shoe into shape.

So far as I am aware, no satisfactory machine has been devised, prior to my present invention, for properly shaping or stretching the rubberized fabric, and then feeding it to the core. This is due to the fact that in order to secure the best results, it is necessary to stretch or shape each strip on its longitudinal median line, without correspondingly stretching its edges, before applying the strip to the core. This stretching of the fabric on its longitudinal median line adapts it to fit properly and smoothly around the tire.

Prior to my invention it has been proposed to feed the rubberized sheets to the core over a straight-sided roll formed with oppositely turned spiral threads intended to spread the sheets. The result of this procedure is to stretch the edges of each sheet as much as, if not more than, the longitudinal median portions thereof, and consequently these stretched edges when subsequently smoothed down on the sides of the core, are compressed into a smaller circumference than the median portion of the strip which lies on the shoe tread, and consequently into a smaller length than said edges had previously been stretched to, with the result that the compressed tire does not possess the maximum strength, particularly at its side portions, which it would possess if the edges of the rubberized strip had not been stretched as much as the longitudinal median portions thereof.

The principal object of the present invention is to provide a satisfactory form of tire shoe-making machine.

A further object is to shape or stretch the longitudinal median portions of the rubberized strips without correspondingly stretching the edges thereof, thereby producing tire shoes having the maximum strength and compactness of structure.

Other objects of the invention are, to improve and simplify the construction of tire shoe making machines, as well as to increase their efficiency in operation and to better the quality of product produced thereby.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawing forming part of this specification,—

Figure 1 is a plan view of a tire shoe making machine constructed in accordance with the present invention;

Fig. 2 is a side elevation thereof;

Fig. 3 is a sectional view on the line 3—3 of Fig. 1 showing the mechanism for locking the tread forming and spinning mechanism in different positions of predetermined adjustment;

Fig. 4 is an end elevation, partly in section, of the tire shoe making machine;

Fig. 5 is a detail view of the screw mechanism for rotating the spinning tool supporting arm;

Fig. 6 is a detail view at a right angle to Fig. 5, showing the spring catch by which the screw may be swung out of engagement with the worm to permit the spinning mechanism to be operated by hand;

Fig. 7 is a view, partly in section and partly in elevation, showing in detail the rollers for shaping or stretching the longitudinal median portions of the rubberized strips, without correspondingly stretching the edges thereof, before feeding said strips to the core;

Fig. 8 is a detail view, partly in vertical section and partly in elevation, showing the rotary and fluid operated head of the spinning mechanism;

Fig. 9 is a view in elevation of the tread forming tool;

Fig. 10 is a collective view showing, respectively, a spinning tool, bead setter, stretching tool, trimming tool, and compression roll, all of which tools are adapted to be rotatably fitted into the rotary head shown in Fig. 8;

Fig. 11 is a detail view in section showing the manner in which the liner is rolled upon the liner support and the rubberized fabric carried over the same;

Fig. 12 is a section on the line 12—12 of Fig. 2.

Brief outline.

In order to facilitate an understanding of the principles of this invention, a brief outline of the entire machine will first be given. The reference letter A at the left hand side of Fig. 1 indicates the stockholder or reel comprising, preferably, a plurality of alternately arranged fabric and liner holders. The sheets of rubberized fabric, interleaved with muslin or other liners, are wrapped upon the fabric holders 1—1—1—1 and are drawn off of the reel by feeding them over the liner holders 2—2—2—2 in such manner that the liners are wrapped upon the liner holders.

From the fabric holders, the sheeted fabric passes to a tension mechanism B which serves to place it under suitable tension or stretching action.

From the tension mechanism B the rubberized fabric passes over shaping rollers C which serve to stretch the longitudinal median portions of the fabric, without correspondingly stretching the edges thereof.

The shaping or stretching rollers are yieldingly mounted in any suitable manner, and a registering dial D is connected therewith to indicate or register the tension under which the fabric is placed by said median line stretching devices.

From the stretching devices C, the rubberized fabric extends to the rotary core E. The reference letter F indicates the tread forming and spinning mechanism by means of which the tread is formed and the sheets of rubberized fabric are spun down into position. The reference letter G indicates the bead setting mechanism.

The reference letter H indicates the change-speed mechanism for driving the core and I indicates the electric motor or other source of power for the machine.

Stock reel.

The stock reel A is journaled at 3 upon the machine frame 4 which may be of any suitable form and construction. The reel A preferably is provided with radially extending arms 5, on the outer end of which are journaled the stock holders 1 and the liner holders 2, which are alternately arranged, as shown. The outer end of each of the alternate arms 5 is preferably extended, as shown at 6, to form a locking device intended to be engaged by a socket 7 on a locking lever 8. The locking lever 8 is fulcrumed at 9 on the machine frame and is provided with a counter-balance member or weight 10 on the side of the fulcrum 9, opposite the socket 7. A foot tread 11 is provided for depressing the locking member 8, so as to permit the reel A to be rotated by hand. A cam portion 12 is formed on the locking member 8 so that when said locking member 8 is unlocked from one arm of the reel, and the reel is rotated the next locking projection 6 on the reel A will engage and ride over the cam portion 12 and be automatically engaged by the socket member 7 of the locking device. It will be noted that the locking projections 6 are absent from the radial arms 5 which carry the fabric holders 1 and are present only on those arms which carry the liner holders 2. By this arrangement, the reel is always locked in position to present one of the fabric holders and one of the liner holders in proper position, as shown in Fig. 2.

As previously indicated, the sheeted or rubberized fabric is wrapped on the fabric holders 1 with a suitable muslin liner to prevent the different convolutions of the fabric from sticking together. When the operator draws the rubberized fabric from one of the fabric holders, he first feeds it over the next higher liner holder, as shown in Fig. 2, at the same time causing the liner to be wrapped on said liner holder. In this way, the movement of the fabric causes a positive rotation of the liner holder and at the same time allows for the differential rotation which results from the gradually increasing size of the liner holder.

Tension mechanism.

From the liner holder 2 the rubberized fabric 15 extends around the tension mechanism B, which, in this instance, consists of a roller 16 fixed on a guard 17, which is journaled in the machine frame, and has fixed on its outer end a friction wheel 18 which is engaged by a band brake 19. One end 20 of the band brake 19 is held by a stud 21 secured to the machine frame, and the other end 22 is adjustably connected with an arm 23 of a bell crank lever 24 fulcrumed at 25 on the machine frame. The other arm 26 of the bell crank lever 24 is provided with a plurality of notches 27 and is engaged slidably by the counterweight 28, intended to be held in position by any one of the notches 27. By adjusting the weight 28 from one notch to another, the tension of the band brake 19 on the friction wheel 18 is adjusted so as to vary the tension which the roller 16 places upon the fabric which extends therearound.

Median line stretching means.

From the tension mechanism B the rubberized fabric preferably is carried upward around the roller 30 journaled at 31 in the machine frame. The function of the roller 30 is to provide for holding an extended length of fabric under tension without unduly prolonging the length of the same.

From the roller 30, the fabric passes downward around a roller 32 which is journaled at 33 upon a frame 34 shown best in Figs. 1, 2 and 7. The frame 34 is pivotally mounted at 35 upon the machine frame. The trunnions of the frame 34 are formed by a shaft or rod 36 which is fixed to the frame 34 and extends through bearings 37 on the machine frame. The rod 36 at one end is extended outward, as indicated in Fig. 7, and has fixed on the outer end thereof an upstanding arm 38. Connected with the arm 38 is a registering mechanism D, which will be hereinafter described.

From the roller 32 on the pivotally mounted frame 34 the rubberized fabric extends upward over the forming or stretching rollers 45—45 shown best in Figs. 2 and 7. The stretching rollers 45 are journaled on the upper end of a standard 46 which extends slidably through a bracket 47 on the outer end of the pivotal frame 34, a set screw 48 being employed to lock the standard 46 in any desired position of vertical adjustment.

The stretching rollers 45, as best shown in Fig. 7, are journaled on studs 49 set into the upper end of the standard 46 and having their heads flush with the outer surfaces of the stretching rollers 45.

The stretching rollers 45 preferably are formed on their outer faces with curved ribs 50 which extend generally in radial directions and tend to facilitate the proper stretching of the fabric and also to cause the rollers to rotate as the fabric moves.

The function of the stretching rollers which, preferably, are arched in cross section, as clearly shown in Fig. 7, is to stretch the rubberized fabric on its longitudinal median line, without correspondingly stretching the longitudinal edges of the fabric, whereby the fabric is stretched into approximate trough shape in cross section before it passes onto the core E.

Registering mechanism.

It will be understood that the forward end 55 of the rubberized fabric is attached to the core E, which is slowly rotated to draw the fabric onto the core against the tension of the tension mechanism B. The fabric is extended at an angle around the stretching rollers 45, as indicated clearly in Fig. 2. The tendency of the stretched fabric is to swing or force the stretching rollers 45 downward upon the fulcrum 35 of the frame 34 which carries said rollers. This downward tendency of the rollers 45 and frame 34 is communicated to the standard 38, which, as previously explained, is rigidly connected with the frame 34. Pivotally connected with the upper end of the standard 38 is a rod 60 which forms one member of the spring scale or registering device D, the other rod 61 of which is pivoted at 62 to an upright 63 rigidly mounted on the machine frame. The pointer 64 of the registering device serves accurately to indicate or register the amount of tension under which the fabric is acting.

Power-driven core.

From the median line stretching means or rollers 45 the rubberized fabric extends to the rotary core E, which may be of any suitable form and construction. The core E is journaled at 65 in standards 66 rising from the machine base 67 and the said core preferably comprises the central portion or hub 68 from which extends radial arms 69 adapted to receive different sizes of cores.

Core driving motor.

The power for driving the core preferably comprises an electric motor I having on the shaft thereof a drive wheel 70, best shown in Fig. 1. The drive wheel 70 is connected with a pulley 71 on a shaft 72 by means of a belt 73. The shaft 72 is journaled in any suitable bearing 74 and is provided on its opposite end with screw threads which engage and rotate a worm wheel 75 fixed on a driven shaft 76 which drives the core through suitable speed changing mechanism, which will now be described.

Speed changing mechanism.

The drive shaft 76, as shown in Fig. 1, has keyed or feathered thereon a double-ended clutch member 80, which is adapted to be moved in either direction on the shaft 76 by means of an operating handle 81. The clutch member 80 can thereby be engaged with a clutch member 82 shown in Fig. 4, which is loose on the shaft 76 and has fixed thereon a pinion 83 engaging with a large gear wheel 84 fixed on the main shaft 65 of the core. When the clutch member 80 is interlocked with the clutch 82 the core E is driven at slow speed.

When the clutch member 80 is moved in the opposite direction it engages a clutch member 85 which is loose on the shaft 76 and has fixed thereon a large gear wheel 86 meshing with a pinion 87 that is fixed on the shaft 65 of the power-driven core. When the clutch member 80 is interlocked with the clutch member 85 the core is driven at a rapid speed. When the clutch member 80 is in its intermediate position, the core stands still.

*Tread forming and spinning mechanism.*

The tread forming and spinning mechanism F is intended to be operated so as to hold any of the tools shown in Figs. 9 and 10 against the shoe. For example, the tread roll 90 is held against the tread portion of the shoe for rolling it down into place, and the spinning tool 91 is employed for spinning down the side portions of each strip of fabric as it is applied to the core, it being understood that the operator first operates the core at slow speed until he has fed a sufficient length of fabric onto the core, after which the fabric is cut off with a pair of scissors in the hands of the operator and the core is spun at high speed and the tread forming and spinning tools are suitably manipulated to shape the shoe.

Each of the rollers or tools preferably is journaled between spaced arms 92 having connected therewith a tapered shank 93 formed with an annular groove 94. The tapered shank 93 is fitted into a socket 95 formed in a plunger head 96. A suitable set screw 97 is then screwed inward to engage the annular groove 94. By means of the set screw 97 the tool can be rotated to any desired position and then locked against further rotation or withdrawal. The plunger head 96 is provided with a shank 98 which slidably extends into a fluid pressure chamber 99 formed in the head 100.

The fluid pressure is admitted to the chamber 99 through a pipe 101 having therein a three-way valve 102 which, when in the position shown in Fig. 8, will admit pressure to the chamber 99 and when turned at a right angle, will exhaust the pressure from the chamber 99 and shut off the source of pressure supply. The plunger 98 is limited in its sliding movement in the rotary head 100 by means of a stop 105 connected with a set screw 106 and located in a longitudinal slot 107 formed in the plunger head 98. By tightening the screw 106 the plunger 98 can be locked against movement in the rotary head 100. By loosening the set screw 106 the plunger 98 is permitted to have limited longitudinal movement under the influence of the fluid pressure.

At its rear end, the plunger 98 is provided with suitable packing material 108. The rotary head 100 is provided with a suitable handle 109 for use in manipulating the same. The head 100 is formed in its lower face, as shown in Fig. 8, with a socket 110 which fits over a stud on the upper end of an arm 111, so as to adapt the head 100 to be rotated in a horizontal plane on the arm 111. A set screw 112 extends through the wall of the socket 110, so as to lock the head 100 against rotary movement on the arm 111, when desired.

The arm 111 is curved at its lower end as shown in Fig. 2, and is journaled for rotary movement around a vertical axis on the upper end of the standard or support 114. For the purpose of rotating the arm 111, said arm has fixed thereon a worm wheel 115 which is engaged by a worm 116 having a hand wheel 117.

It is sometimes desirable to manipulate the rotary arm 111 by hand, without interference from the worm 116, and means for accomplishing this result is best shown in Figs. 5 and 6. The worm 116 is mounted for rotation in a frame 118 which is pivoted at 119 on a bracket 120 permanently bolted to the standard or support 114. The opposite end of the frame 118 is engaged by the nose 121 of a spring 122 that is bolted at 123 to the bracket 120. A lip 124 is formed on the outer end of the spring 122 by means of which lip said spring can be depressed so as to move the beveled nose 121 out of engagement with the frame 118 of the screw or worm 116. By depressing the spring 122 the worm or screw 116 can be swung outward on its fulcrum or pivot 119, so as to become disengaged on the worm wheel 115 and thus permit the rotary arm 111 to be manipulated by hand.

For the purpose of moving the tread forming and spinning mechanism bodily toward and from the periphery of the core E, the support 114 is slidably mounted upon the base 67 of the machine frame. The numeral 125 in Fig. 4 indicates a dove-tail member which fits into a dove-tail slot formed in the under face of the base plate 126 of the tread forming support 114. A wear plate 127 is interposed between the members 125—126 and is held in place by screws 128. Fixed on the base 67 is an upright 130 in which is journaled a shaft 131 having a hand wheel 132 and being threaded at its inner end to engage a boss 133 mounted on the base plate 126. By turning the hand wheel 132 the base plate 126 is adjusted longitudinally.

For the purpose of automatically locking the base plate 126 in different positions of adjustment to suit the different sizes of tire shoes, a stop 135, best shown in Fig. 3, is extended through the base plate 126 in position to be operated by the coiled spring 137, so as to be forced downward into any one of a series of sockets 138. The catch 135 serves automatically to lock the spinning mechanism in any one of a number of predetermined positions of adjustment.

Bead setting mechanism.

The bead setting mechanism is indicated by the letter G and includes a curved arm or support 140 which is bifurcated or arranged at its lower end as indicated at 141 in Fig. 4, and fulcrumed by means of the shaft 31 to which said arms 141 are pinned, as indicated at 142. Pinned on the outer end of the shaft 31 is a collar 143 from which depends a rigid arm 144 having on the lower end thereof a worm segment 145 engaged by a screw 146 on a shaft 147, journaled in the machine frame and operated by means of a hand wheel 148. By turning the hand wheel 148, the bead setting support 140 is swung toward or from the periphery of the core on an axis parallel with the axis of the core.

The bead setting mechanism proper is mounted on the upper end of the supporting arm 140 and includes a head 160 having a hub 161 which fits onto the end of the arm 40 and is held thereon by means of a set screw 162.

Pivotally mounted on the head 160, as indicated at 163—163 is a pair of arms 164—164 each having journaled on their lower end a beading roller 165 formed with a V-shaped groove to receive the bead and press it against the tire.

The means for forcing apart the upper ends of the levers 164 so as to press the beading rollers toward each other, preferably consists of a wedge block 166 shown best in Fig. 12, said wedge block having a dove-tail portion 167 fitted into and slidable vertically within an undercut slot formed in the head 160.

Journaled in a boss 170 fixed on the head 16 is a screw shaft 171 operated by means of a hand wheel 172 and having a threaded lower end which engages an internally threaded boss 173 fixed on the wedge block 166. By turning the hand wheel 171 the wedge block 166 can be moved upward so as to force apart the upper ends of the levers 164 and press the beading rollers 165 against the tire casing.

It will be understood that in forming the beads, the ends of said beads are secured to the sides of the tire casing or shoe and the core is slowly rotated, whereby the bead setting rollers 165 guide and press the beads into position.

Operation.

The strips of rubberized fabric which have been previously cut on a bias are placed on the fabric holders 1—1 in such manner that the warp threads of the strips on one fabric holder are at right angles to the warp threads of the strips on the next fabric holder, whereby the operator can feed a length of strip from one reel onto the core and properly cut it off and smooth it down, after which he can feed a strip from the next adjacent fabric holder in such manner that its threads will cross the threads of the previous strips.

The tension mechanism of course holds each strip of material under proper tension while it is being fed to the core and the shaping rollers 45 serve as one convenient means for stretching the strips of fabric on their longitudinal median lines without correspondingly stretching their edges, so as to shape the strips properly as they are fed to the core, and thus adapt said strips to be subsequently smoothed down onto the core by means of the tread forming and spinning mechanism.

After the tire shoe has been built up to the proper point, the beads are applied and rolled into place by the bead setting rollers.

What is claimed is:

1. A tire shoe making machine having a core, yieldingly mounted means for stretching the longitudinal median portion of the tire fabric without stretching the edges thereof, and a registering device connected with and operated by said yieldingly mounted means for indicating the position thereof.

2. A tire shoe making machine having a core, a tension mechanism and yieldingly mounted means for stretching the longitudinal median portions of the tire fabric relatively to the margins thereof.

3. A tire shoe making machine having a core, a tension mechanism and yieldingly mounted means for stretching the longitudinal median portions of the tire fabric relatively to the margins thereof, and a gage for said stretching means.

4. A tire shoe making machine comprising a fabric holder, a tension device, yieldingly mounted shaping rollers, one of which rollers includes means for stretching the longitudinal center of the fabric independently of the margins thereof, a gage connected with said shaping rollers, and a power-driven core.

5. A tire shoe making machine having a reel provided with alternately arranged fabric and liner holders, the fabric from each fabric holder being passed around the adjacent liner holder, a tension device to receive the fabric as it leaves the liner holder, means for stretching the longitudinal median portions of the fabric as it leaves the tension mechanism without stretching the edge portions thereof, and a movable core to receive said stretched fabric.

6. A tire shoe machine comprising a transversely convexed rotary core; a transversely convexed stretching element; means for supporting the stretching element yieldingly; and means for feeding the material to be stretched, into tangential contact with the core and the stretching element upon a common side of the axes of the core and the stretching element.

7. A tire shoe machine comprising a transversely convexed rotary core; a transversely convexed rotary stretching element; means for supporting the stretching element yieldably for movement toward and away from the core; and means for feeding the material to be stretched, into tangential contact with the core and the stretching element upon a common side of the axes of the core and the stretching element.

8. A tire shoe making machine comprising a core, and resiliently mounted means engaging and working the fabric longitudinally along the middle thereof without correspondingly working the edges of said fabric.

9. A tire shoe making machine comprising a core, and resiliently mounted means engaging and working the fabric longitudinally along the middle thereof without correspondingly working the edges of said fabric, said means also acting to shape the fabric so as to cause the same to conform to the contour of the rim of the core.

10. A tire shoe making machine comprising in combination, a rotatable core, means for supplying fabric to said core, a yieldingly mounted frame and a former adjustably connected with said frame and engaging the fabric to shape the same before it passes on to the core.

In testimony that I claim the foregoing as my own, I have hereto affixed my signature in the presence of two witnesses.

FRANKLIN W. KREMER.

Witnesses:
SELINA WILLSON,
ROSE CLARK.